United States Patent
Ireman et al.

(10) Patent No.: US 8,299,405 B2
(45) Date of Patent: Oct. 30, 2012

(54) HOUSEHOLD APPLIANCE FOR HEATING LIQUID

(75) Inventors: Peter Ireman, Ver sur Mer (FR); Lionnel Durand, Saint Germain Langot (FR); Christian Diore, Cairon (FR)

(73) Assignee: SEB S.A., Ecully (FR)

( * ) Notice: Subject to any disclaimer, the term of this patent is extended or adjusted under 35 U.S.C. 154(b) by 998 days.

(21) Appl. No.: 12/302,230

(22) PCT Filed: Jun. 4, 2007

(86) PCT No.: PCT/FR2007/051374
§ 371 (c)(1),
(2), (4) Date: Nov. 24, 2008

(87) PCT Pub. No.: WO2007/141453
PCT Pub. Date: Dec. 13, 2007

(65) Prior Publication Data
US 2009/0114637 A1    May 7, 2009

(30) Foreign Application Priority Data

Jun. 5, 2006 (FR) .................... 06 04982

(51) Int. Cl.
*A47J 27/21* (2006.01)
*A47J 27/212* (2006.01)
*H05B 1/02* (2006.01)
*H05B 3/22* (2006.01)
*H05B 3/26* (2006.01)

(52) U.S. Cl. ........ 219/441; 219/506; 219/510; 219/521; 99/331; 99/337; 99/403

(58) Field of Classification Search .......... None
See application file for complete search history.

(56) References Cited

U.S. PATENT DOCUMENTS

| | | | | |
|---|---|---|---|---|
| 4,286,377 A | * | 9/1981 | Hurko et al. | 29/612 |
| 5,793,020 A | * | 8/1998 | O'Neill | 219/441 |
| 5,793,929 A | * | 8/1998 | Taylor | 392/498 |
| 5,946,448 A | * | 8/1999 | Taylor | 392/501 |
| 6,043,467 A | * | 3/2000 | Little | 219/542 |
| 6,046,438 A | | 4/2000 | Slegt et al. | |
| 6,153,859 A | * | 11/2000 | Taylor et al. | 219/441 |
| 6,180,925 B1 | * | 1/2001 | Moore et al. | 219/441 |

FOREIGN PATENT DOCUMENTS

| | | |
|---|---|---|
| FR | 2791857 | 10/2000 |
| GB | 2269980 A * | 3/1994 |
| WO | WO-9854931 | 12/1998 |
| WO | WO 9948333 A2 * | 9/1999 |

OTHER PUBLICATIONS

International Search Report for International Application No. PCT/FR2007/051374, dated Dec. 4, 2007, 3 pages.

* cited by examiner

*Primary Examiner* — Joseph M Pelham

(57) ABSTRACT

Household electrical appliance for heating liquid including a tank, a heating element having at least one resistive track screen-printed on an electrically insulating plate secured to part of said tank, and a device controlling the electrical supply of said heating element. The control device includes several electronic components among which are at least one thermometric component, a switching component capable of opening and closing the electrical power supply circuit for said heating element, and a control component for controlling said switching component according to signals output from said thermometric component. At least said thermometric, switching and control components are located on said insulating plate within a single area free of resistive track, said area being surrounded by a peripheral region free of resistive track and of electronic components.

12 Claims, 2 Drawing Sheets

HOUSEHOLD APPLIANCE FOR HEATING LIQUID

CROSS REFERENCE TO RELATED APPLICATION

This application is a National Stage filing under 35 U.S.C. §371 of PCT Application No. PCT/FR2007/051374, filed Jun. 4, 2007. This application also claims the benefit of French Application No. 0604982, filed Jun. 5, 2006. The entirety of both applications is incorporated herein by reference.

FIELD OF THE INVENTION

The present invention relates to a household electrical appliance for heating liquid, with a tank containing the liquid to be heated, such as a kettle. The present invention falls within the field of domestic electrical appliances with a tank which serves as an enclosure containing the liquid to be heated.

BACKGROUND OF THE INVENTION

The term "kettle," in general, designates a household electrical appliance for domestic use with a tank intended to contain the liquid to be heated. Kettles also include a heating element with a resistive element generally situated at the bottom of the tank. When this resistive element is supplied with electrical current, it is able, via the Joule effect, to heat the liquid contained in the tank.

Electric kettles are generally characterised by the low electrical power which they use, typically less than 3000 W, and by their relatively low capacity, typically less than 2.5 litres. Usually, such electric kettles are used to bring water to boiling point, as quickly as possible and several times each day. Kettles must therefore, like its other mass-market household electrical appliances, be robust, efficient and cheap.

However, kettles known in the prior art are not entirely satisfactory in terms of reliability and/or cost. Firstly, kettles are known, for example, whose lower part incorporates, beneath the metal dish intended to transmit the heat emitted by the resistive track, a complete sub-assembly grouping together all the components necessary for the functions of heating, regulation, safety, connection and control.

For connection to the source of electrical energy, such sub-assemblies generally include electromechanical connectors which are complex parts, and therefore expensive.

Moreover, all these components must be placed at a certain distance from the heating element, which results in a not inconsiderable spatial requirement. In addition, the function of regulation or detection of boiling is often performed by a component known as a "bimetal" which breaks the power supply circuit to the heating element by a difference in thermal expansion between the two metals of which it is made. However, so that the bimetals can play their role, it is necessary to provide a duct capable of bringing them into contact with the steam produced by the boiling of the liquid contained in the tank. Such an arrangement is liable to add significantly to the manufacturing costs, and therefore the cost price of such a kettle. Moreover, the accuracy of bimetal components is relatively limited, in other words, the cessation of heating via these components occurs at varying times.

More recently, this bimetal component was replaced by an electronic thermometric component, that is, a component capable of measuring the rise in temperature during heating, of the negative temperature coefficient (N.T.C.) resistor type or thermostat type. A thermometric component is understood to be a component delivering an electrical signal capable of changing with the temperature of its surroundings.

However, although such electronic components are actually superior to bimetal components in terms of lifespan and accuracy of temperature measurement, the position of such components near to the heating element poses problems in kettles of the prior art. Thus, as such electronic components are capable of withstanding relatively high temperatures, they are positioned close to the resistive track of the heating element, that is, in proximity to a zone favourable to the formation of scale, as is the case for example with the kettle of document FR-A-2 791 857.

In general, the function of the thermometric components mentioned above is to measure a temperature representative of the temperature of the heated liquid, but they do not measure the temperature of the liquid directly. On the contrary, these thermometric components measure the variation in the temperature of the resistive track, which temperature indirectly represents the temperature of the heated liquid, as is the case for the kettle in the document cited above.

In fact, as long as the liquid is heating, the temperature of the resistive track increases. When the liquid boils, that is, when its temperature no longer varies, the dissipation of the calorific energy from the resistive track to the liquid slows down and as a result, the temperature of the resistive track begins to stagnate. It is the detection of this stagnation by the regulation circuit which leads to the control circuit cutting the power supply to the heating element.

However, the layer of scale which progressively forms with each heating cycle on the dish transmitting the heat to the liquid, tends to thermally "insulate" the resistive track from the heated liquid. Consequently, as scale builds up in the kettle, the temperature at the resistive track, that is, the temperature measured by the thermometric components mentioned above, tends to be less representative of the temperature of the heated liquid.

This drift can cause the period of time taken to heat the liquid to boiling point to become longer or shorter, which is not satisfactory for the user. Either the electricity consumption of the kettle will increase because of the excessive heating period, or the liquid no longer reaches the target temperature, for example 100° C. in the case of boiling.

In the worst case, excessive drift leads to the destruction of a safety component associated with the heating element, such as a thermal fuse, and as a result, to the kettle being switched off permanently.

Furthermore, document WO-A-98 54931 discloses a kettle whose thermometric component is arranged approximately at the centre of a carrier plate for the resistive tracks and whose other control components are moved to a handle of the kettle.

The aim of the present invention is therefore to eliminate, or at least severely restrict, errors in measuring the temperature of a heating element as scale builds up on it, and thus to prevent any drift in the regulation of the temperature of the heated liquid.

Besides remedying unreliability, the aim of the present invention is also to remedy the other disadvantages of kettles of the prior art, particularly in terms of ease of production and thus of cost and spatial requirement.

SUMMARY OF THE INVENTION

The present invention thus relates to a household electrical appliance for heating liquid, whose temperature regulation does not depend on the amount of scale on the heating element, whose design allows it to be produced easily and cheaply, and whose electrical components can be positioned within a smaller space.

The present invention concerns a household electrical appliance for heating liquid having a tank intended to contain the liquid to be heated, a heating element with at least one resistive track produced by silk-screening onto an electrically insulating plate integral with a portion of said tank, and a device for controlling the power supply to said heating element. This control device has a plurality of electronic components amongst which are at least one thermometric component, a switching component capable of opening and closing the power supply circuit of said heating element and a control component intended to control said switching component in accordance with the signals output from said thermometric component. According to the invention, this apparatus is characterised in that at least these thermometric, switching and control components are located on said insulating plate within a single area free of resistive track, this area being surrounded by a peripheral zone free of resistive track and of electronic components.

In other words, the thermometric component is located at a distance from the resistive track. Thus, the thermometric component measures the temperature of the insulating plate in an area whose temperature is influenced more by the temperature of the liquid than by the temperature of the heating resistor. In the next part of the description, "electrically insulating plate" will designate a plate which is not necessarily electrically insulating in its entirety, but which is electrically insulating at least on the face which receives the resistive track. It may thus be a metal plate, typically of stainless steel used for its food-compatibility properties, coated with a layer of enamel or similar on its face intended to receive the resistive track. It may also be a plate of an electrically insulating material, typically a ceramic- or glass-based material, onto which the resistive track can be screen-printed directly. This same plate may, as applicable, be covered, on its face in contact with the liquid, with a layer compatible with contact with food. This layer may for example be stainless steel-based.

In practice, the width of the peripheral zone may be such that the maximum temperature of any one of its points, particularly near the thermometric component, remains below 105° C. when there is liquid in the tank.

Thus, the component can be situated in an area where relatively little scale forms.

Moreover, the fact that the main electronic components of the control device are all located within the same characteristic area makes it possible to reduce the space occupied by the electronic components of the control device.

According to one embodiment of the invention, the width of the peripheral zone may be greater than or equal to 5 mm.

This makes it possible to limit the temperature of the area in which the thermometric component is located.

According to another useful feature of the invention, the surface area of said area may represent at least 10% and more particularly at least 15% of the total surface area of the insulating plate.

This makes it possible to ensure that the temperature in this area is relatively cold, which contributes to the proper functioning of the electronic components located there.

According to a useful embodiment of the invention, the thermometric component may be located in the central portion of the insulating plate.

This makes it possible, in particular, to measure a temperature representative of the temperature of the liquid being heated.

Usefully, the thermometric component can be surface-mounted on the face of the insulating plate over which the resistive track extends. This feature makes it easier to manufacture the appliance, to reduce its dimensions and thus to reduce the cost price.

In practice, the thermometric component may be a thermistor whose resistance varies according to the temperature of the insulating plate situated near said area. Such a component makes it possible to measure temperatures with an accuracy, measuring range and responsiveness appropriate to the heating cycle of the appliance.

Practically, the thermistor may be of the negative temperature coefficient type. Such a component has a signal which can easily be used to control the switching component.

According to another advantageous embodiment of the invention, the household electrical appliance may have a second thermometric component located on said insulating plate in proximity to the resistive track.

This second thermometric component may thus, unlike the first, be located in an area of the heating element on which scale builds up relatively easily. Consequently, by comparing the temperature measured by this second thermometric component with that measured by the first, the extent of the scaling of the appliance can be determined. In particular, this second thermometric component makes it possible to detect when the kettle is switched on without water in the tank, a form of operation known as "dry operation", likely to lead to the temperature of the heating tracks rising rapidly until they are destroyed.

In practice, the appliance can have a warning circuit capable of providing a visible or audible signal when the difference between the temperatures measured by the two thermometric components exceeds a predetermined threshold.

Moreover, the present invention also relates to a method, whose implementation is simplified, for the manufacture of a household electrical appliance for heating liquid. Such a method makes it possible to produce such electrical appliances at a lower cost.

The method of the invention is intended for the manufacture of a household electrical appliance for heating liquid having a tank intended to contain the liquid to be heated, this tank having a heating element including an insulating plate. According to the invention, this method includes stages consisting of:

automated production of a resistive track by silk-screening onto the insulating plate;

automated coating of this insulating plate with at least one protective layer;

automated production of a control device having a plurality of electronic components amongst which are at least one thermometric component, a switching component capable of opening or closing the power supply circuit of the heating element and a control component controlling this switching component in accordance with signals output from the thermometric component, the electronic components being connected by electrically conductive tracks whose production is also automated.

The method of the invention is characterised in that at least the thermometric component is located on said insulating plate within an area free of resistive track, said area being surrounded by a peripheral zone free of resistive track and of electronic components.

In practice, the positioning of all these electronic components within said area can be automated.

BRIEF DESCRIPTION OF THE DRAWINGS

The manner in which the invention can be embodied and the advantages which result from this will appear more clearly from the sample embodiment which follows, given as a guide and not limiting, and as supported by the appended drawings.

DETAILED DESCRIPTION OF THE INVENTION

Figure 1:
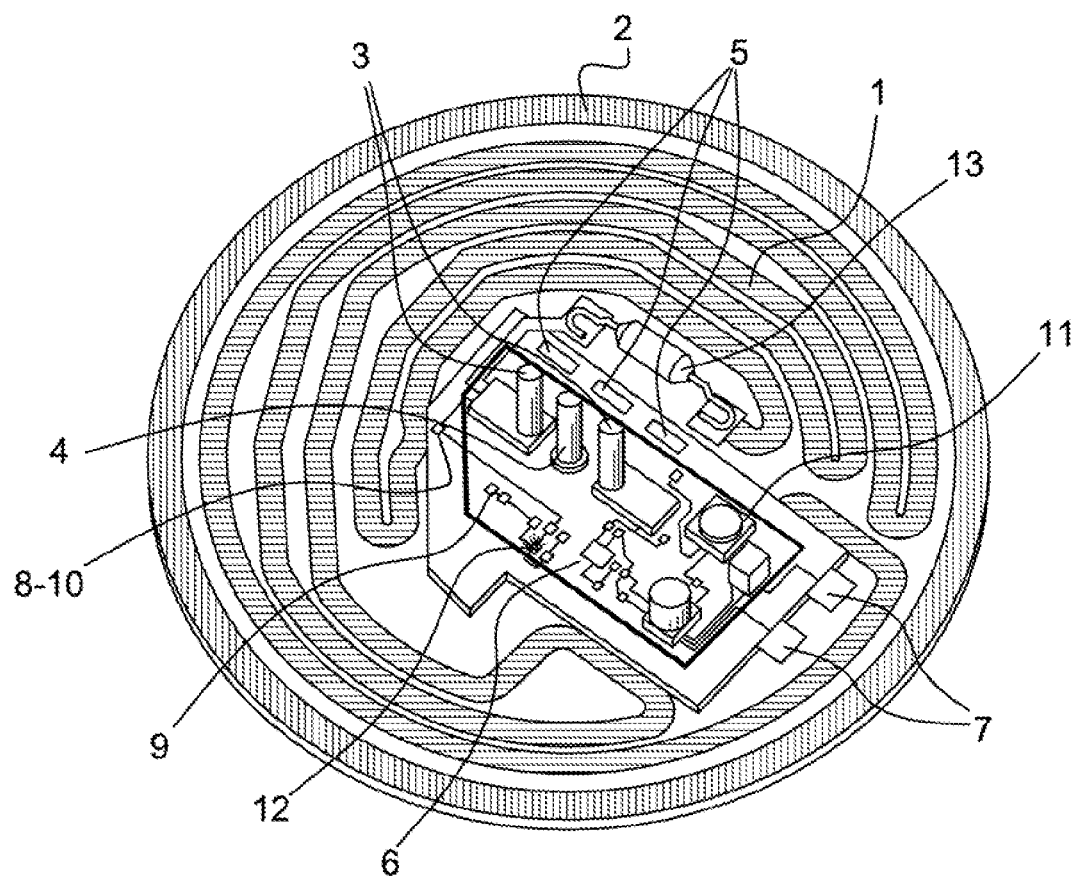
FIG. 1 is a diagrammatic summary perspective representation of some of the electrical parts of an appliance according to the invention.
Figure 2:
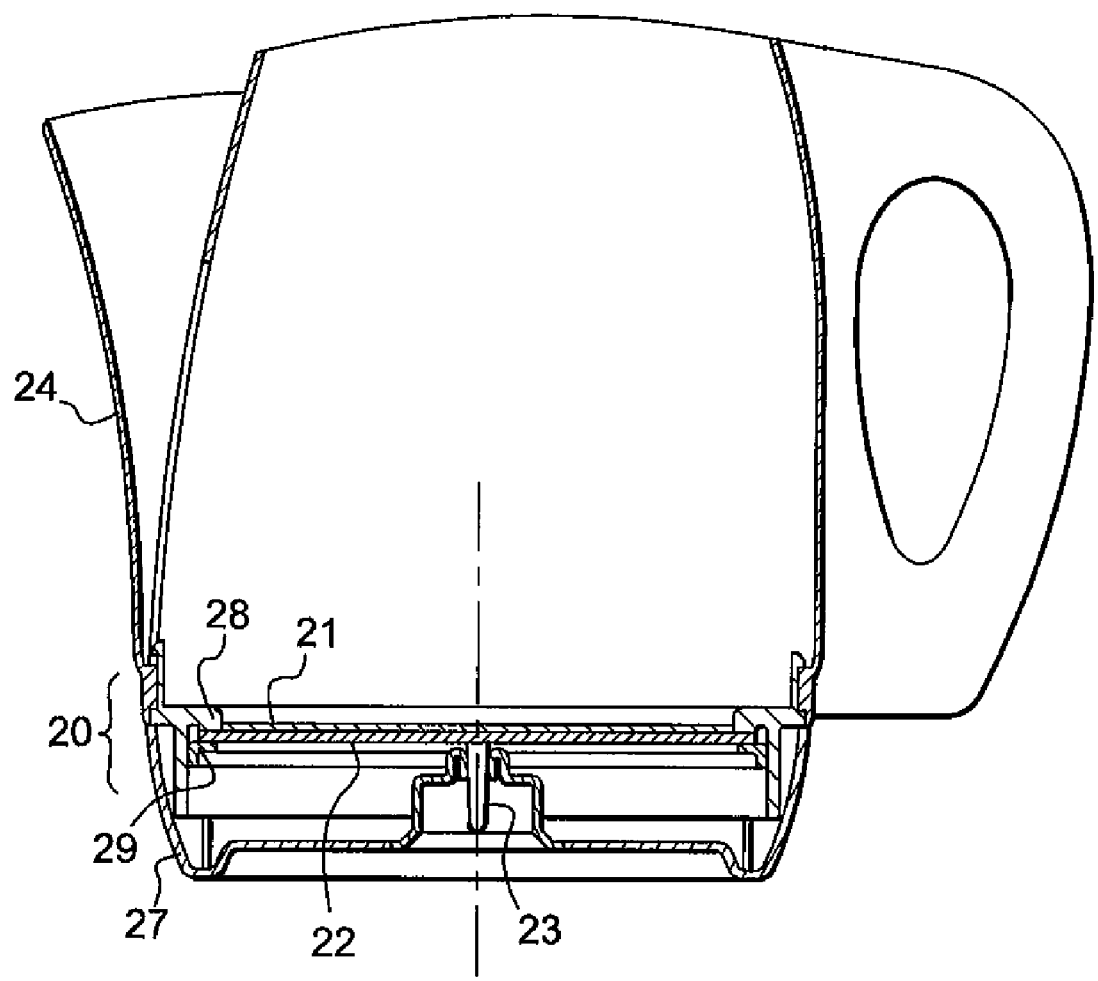
FIG. 2 is a diagrammatic representation in cross-section of the body including the tank of a domestic electrical appliance according to the invention.

FIG. 1 shows the electrical parts of a domestic electrical appliance according to an embodiment of the invention and shown in FIG. 2. Usually, as FIG. 2 shows, the bottom of the kettle has a dish 20 in the overall form of a disc, but which could also take other forms without falling outside the scope of this invention. The dish 20 consists here of a planar metal base 21 joined to the walls 24, usually of plastic material, of the kettle at the bottom of the tank forming the kettle.

The dish 20 is usually joined by means of a flange (not shown) produced by drawing and provided on the circumference of the metal base 21. In order to avoid overheating the walls 24 of plastic material, the dish 20 may have on its periphery an element or a shape, for example a frusto-conical annulus, capable of generating a thermal gradient limiting the temperature of the flange.

In this case, the dish consists of a planar heating plate 22 held in a sealed fashion between two peripheral rings, an upper ring 28 and a lower ring 29, themselves tightly held by a lower fixing skirt 27 extending the external wall of the kettle.

The metal base 21 is made of a metal compatible with sanitary and alimentary requirements, such as a stainless steel. The stainless steel may also be chosen according to the rate at which scale forms on it, in order to delay and limit the formation of scale.

The dish 20 thus joined therefore has its face equipped with the components turned downwards. Furthermore, as is usual, the base of the kettle is capable of being connected to a base for the supply of electrical power.

FIG. 1 shows the "dry" face of the dish generally situated at the bottom of the tank making up the kettle. This face is described as "dry" in contrast with the face which is in contact with the liquid to be heated. The other face of the dish, or "upper" face, is actually in contact with the liquid and can therefore be called the "wet" face of the insulating plate 2. The wet face is generally made of the metal forming the metal base 21 in order to transmit the calorific energy to the liquid to be heated over the whole surface of the dish 20.

On the "dry" face, as FIG. 1 shows, there is a heating element with a resistive track 1 produced on an electrically insulating plate 2. "Electrically insulating plate" is understood, in the context of FIGS. 1 and 2, to mean a plate with an electrically insulating coating deposited on the metal base 21 constituting the dish 20. In this case, the electrically insulating plate 2 has one or more than one layer of enamel covering the lower face of the metal base 21 constituting the dish 20.

The thickness and the nature of the layers of enamel, like those of other materials of which the dish 20 might be made, are chosen in order to adequately transmit to the liquid to be heated the calorific energy released by the Joule effect at the resistive track 1. In other words, although they are electrically insulating, the materials of which the dish 20 is made are nevertheless relatively good thermal conductors.

As an alternative to this embodiment of the dish 20, the base of the dish can be made of an electrically insulating material, such as a ceramic material or glass. For this, a material compatible with sanitary and alimentary requirements can be used, or an electrically insulating material can be coated with a film which has this compatibility. In addition, the remainder of the tank, and particularly the walls, can be made of glass, which provides, in particular, good relative thermal insulation and visual monitoring of the state of the liquid being heated.

Situated at the central part of the insulating plate 2 is a device for controlling the power supply to the heating element made up of several electronic components. These electronic components include, in particular, a thermometric component 9, in this case a negative temperature coefficient (N.T.C.) resistor, a switching component 11 capable of opening and closing the power supply circuit of the heating element, and a control component 6 intended to control the switching component 11 in accordance with the signals output from the thermometric component 9.

In the example shown in FIG. 1, the thermometric component is thus a negative temperature coefficient (N.T.C.) resistor, but it can also be another electronic component provided that the latter is capable of putting out an electrical signal which can change with the temperature of its surroundings and capable of withstanding cycles of temperature increase to a high temperature, typically in a range between 100° C. and 125° C.

Thus the thermometric component 9 may consist of a microcontroller, and in particular the microcontroller controlling the power supply to the resistive track. In fact, the clock frequency of certain microcontrollers varies according to the temperature of their surroundings, that is, the area nearby. This structure makes it possible to reduce the number of electronic components needed.

The switching component 11 which by definition acts as the element which cuts the power supply, is a triac in the example in FIG. 1. However, another electronic component, such as a relay, could perform this function.

Likewise, the control component 6 controlling the triac 11 is illustrated here by a microcontroller. However, here again, it is possible to use another component to control the switching component 11 without going beyond the scope of this invention.

According to the invention, the thermometric component 9 is located on the insulating plate 2 within an area free of resistive track 1. In addition, this area, indicated in FIG. 1 by a thick dark line, is surrounded by a peripheral zone which is also free of resistive track 1 and of electronic components. Thus, this peripheral zone is a kind of "no man's land" or "electronic desert".

Consequently, the thermometric component 9 is located at a distance from the resistive track 1. It is thus not in immediate proximity to the zones of the dish where relatively large deposits of scale will gradually build up with each heating cycle.

Thus with an appliance constructed according to the invention, the scaling of the dish virtually cannot result, for a single actual temperature of the liquid, in drift of the signal produced by the thermometric component 9. In other words, the thermometric component measures the temperature of the liquid as directly as possible, without needing to make use of an intermediate measurement which itself is corrected by interpolation according to a predetermined calibration.

Furthermore, the use of an electronic component to measure the temperature of the heated liquid makes it possible to eliminate the steam duct previously used to detect boiling of the liquid. Where a negative temperature coefficient type of variable resistor is used, greater accuracy in the measurement of the temperature of the liquid can also be obtained.

In other words, the thermometric component 9 is located on the insulating plate 2 within an area which can be described as "cold" relative to the temperatures which prevail near the resistive tracks. Indeed, given the thermal convection which occurs within the liquid and the thermal conduction which occurs in the dish, the temperature of the "cold" area rises slightly above the temperature of the liquid, particularly during boiling.

Thus, in the case of water, the boiling temperature is 100° C., whilst the maximum temperature of the cold area is between 80° C. and 105° C. Where no liquid is present, obviously, the calorific energy emitted by the resistive track 1 is less well dissipated, so that the cold region may exceed 105° C. However, in such a case, a thermal safety component, such as a fuse, can be provided to cut the power supply.

In practice, the peripheral zone has a width of at least 5 mm free of resistive track 1 and of electronic components. It thus constitutes a "no man's land" "or an electronic desert delimiting the "cold" area of the insulating plate 2.

In the example shown in FIG. 1, all the electronic components of the control device are located within this cold area, which ensures that they have a maximum lifespan. Furthermore, the surface area of the cold area free of resistive track 1 represents 15% of the total surface area of the insulating plate 2. This feature makes it possible to delimit a relatively extensive cold area whose maximum temperature is slightly higher than the temperature of the liquid.

Furthermore, in the example shown in FIG. 1, the thermometric component 9 is located in the central portion of the insulating plate 2. This makes it possible to measure a temperature which is even more directly representative of the heated liquid and is virtually independent of the instances of thermal convection which can occur at the edges of the tank and thus of the dish.

FIG. 1 also shows other components of the control device of the kettle, whose functions are similar to those of the prior art. These components include, amongst others:

the connector 3, 23 for power supply at mains voltage, for example at 220 V, whose pins are soldered to a metal layer, for example of silver, silk-screened onto the insulating plate 2;

an earth pin 4 soldered directly to the metal base 21, for example of stainless steel, acting as a radiator; this earth pin can be isolated from the power supply pins by the layers of insulation forming the insulating plate 2;

resistors 5 for supply of power at low voltage, for example at 15 V, to the electronic control circuit of the appliance (in the centre of the insulating plate 2 in FIG. 1) as soon as it is placed on its base;

some start contacts 7 connected to the inputs of the microcontroller 6;

a standard thermal fuse 13 acting as a safety component in the event of a failure in the regulation circuit controlled by the microcontroller 6;

a light-emitting diode 12 acting as a luminous on/off signal and whose light is conveyed towards the exterior of the kettle;

a component 10 to detect "dry" operation, that is, operation in the absence of liquid, in this case consisting of a negative temperature coefficient thermistor.

In operation, when the resistive track 1 of the heating element is supplied with electrical power, the liquid contained in the tank heats up, causing the temperature around the thermometric component 9, to rise. Thus, when the water is boiling, the microcontroller 6, controls the switching component 11, according to the signal output by the thermometric component 9, in such a way as to open the circuit for supplying electrical power to the resistive track 1 and thus stop the heating of the liquid. The transition of the water to boiling point is determined by the measurement made by the negative temperature coefficient (N.T.C.) resistor 9.

Furthermore, according to another advantageous embodiment of the invention a second thermometric component 8 can be located in a zone susceptible to scaling, in practice close (approximately 3 mm) to a resistive heating track, in such a way as to detect or even to quantify the scaling of the kettle.

In practice, this second thermometric component 8 can be the same as the component 10 for detection of "dry" operation.

Indeed, the difference between the temperatures measured by the thermometric component 9 and by this second additional thermometric component is dependent on the thickness of the layer of scale deposited on the dish. Consequently, it is possible to quantify the scaling of the kettle and thus to warn the user of same if a predetermined threshold is exceeded.

The user may thus be informed of the worrying level of scaling of his kettle. If the kettle is descaled, such a feature also makes it possible to ensure drift-free operation of the first thermometric component since the small amount of scale which might possibly be deposited near it is eliminated in time.

In manufacturing the appliance subject of the invention, it is possible to operate using a process whose implementation is relatively automated, in order to produce such electrical appliances at a lower cost and at a consistent quality.

Such a process includes stages which consist of:
automated production of a primary insulating layer on the metal base 21;
automated production of the resistive track 1 by silk-screening on the insulating plate or layer 2;
automated production of a circuit of conductive tracks on the insulating plate or layer 2;
automated coating of the insulating layer 2 with at least one protective layer, creating openings in the positions intended for the connections for components and connectors;
automated production of a control device with a plurality of electronic components.

These components include, amongst others, the N.T.C. resistor 9, a switching component 11 for the circuit supplying power to the heating element, a component 6, for controlling the switching according to the signals from the N.T.C. resistor 9, and a second N.T.C. resistor (not shown) intended to determine the degree of scaling of the kettle. During the stage when the electrical connections between components are made, the electronic components are connected by electrically conductive tracks, also produced in an automated manner.

According to this method, the N.T.C. resistor 9 is located on the insulating plate 2 within an area free of resistive track 1 and surrounded by the "no man's land", that is, the peripheral zone free of resistive track and of electronic components.

Furthermore, the electrical connections between components and some end contacts of the conductive tracks are produced by depositing a layer, for example of silver, in the openings situated at the relevant positions. Other layers are then produced in such a way as to protect all the electronic components and conductors, such as resistive track and electrical connections, placed on the "dry" face of the dish.

The result of the above is that the appliance subject of the invention is more reliable, because the temperature regulation does not depend on the scaling of the heating element. Moreover, given its structure, the production of such an appliance is made easier, and its cost price and space requirement are thus reduced.

In addition, the positioning of the electrical or electronic components can be effected within a smaller space, whilst at the same time ensuring that their lifespan is relatively long, because their distance from the resistive track means that they are not heated excessively.

The positioning of a light-emitting diode in the circuit for the control device makes it possible, via a light guide extending from a retaining ring 28, 29 or from the lower skirt 27, to produce a luminous indicator for a very small additional cost. The guide can bring the light to several peripheral places on the lower skirt 27 for better visibility.

Such an appliance can be used to heat water, milk or a similar liquid. Depending on its use, it may be commonly called a kettle or milk foamer etc.

The invention claimed is:

1. A household electrical appliance for heating liquid comprising:
   a tank configured to contain the liquid to be heated;
   a heating element having at least one resistive track produced by silk-screening onto an electrically insulating plate integral with a portion of said tank; and
   a device for controlling the power supply to said heating element, said control device having a plurality of electronic components including at least one thermometric component,
   a switching component capable of opening and closing the power supply circuit of said heating element; and
   a control component configured to control said switching component according to the signals output from said thermometric component,
   wherein at least the said thermometric, switching and control components are located on said insulating plate within a single area free of resistive track, said area being surrounded by a peripheral zone free of resistive track and of electronic components.

2. The appliance according to claim 1, wherein said peripheral zone has a width such that the maximum temperature of any point whatsoever in said area, near the thermometric component remains below 105° C. when there is liquid in said tank.

3. The appliance according to claim 1, wherein the width of said peripheral zone is greater than or equal to 5 mm.

4. The appliance according to claim 1, wherein the surface area of said area represents at least 10% of the total surface area of the insulating plate.

5. The appliance according to claim 1, wherein said thermometric component is located in a central portion of the insulating plate.

6. The appliance according to claim 1, wherein the thermometric component is surface mounted on a face of the insulating plate over which the resistive track extends.

7. The appliance according to claim 1, wherein the thermometric component is a thermistor whose resistance varies according to the temperature of the insulating plate situated near said region.

8. The appliance according to claim 7, wherein the thermistor is of a negative temperature coefficient resistor type.

9. The appliance according to claim 1, further comprising a second thermometric component located on said insulating plate in proximity to said resistive track.

10. The appliance according to claim 1, further comprising a warning circuit capable of providing a visible or audible signal when the difference between the temperatures measured by said thermometric components exceeds a predetermined threshold.

11. A method for manufacturing a household electrical appliance for the heating of liquid having a tank intended to contain the liquid to be heated, said tank having a heating element including an electrically insulating plate, said method comprising:
    producing a resistive track by silk-screening onto said electrically insulating plate;
    coating of said electrically insulating plate with at least one protective layer;
    producing a control device having a plurality of electronic components amongst which are at least one thermometric component, a switching component capable of opening or closing the power supply circuit of said heating element and a control component controlling said switching component in accordance with signals output from said thermometric component, said electronic components being connected by electrically conductive tracks whose production is also automated;
    wherein at least said thermometric, switching and control components are located on said electrically insulating plate within a single area free of resistive track, said area being surrounded by a peripheral zone free of resistive track and of electronic components.

12. The method according to claim 11, wherein the positioning of all said electronic components within said area is automated.

* * * * *